May 13, 1941.  J. C. HOSTETTER  2,242,129
METHOD AND APPARATUS FOR MAKING OPTICAL GLASS
Filed Feb. 7, 1939  2 Sheets-Sheet 1

INVENTOR.
JOHN C. HOSTETTER
BY
ATTORNEYS.

Patented May 13, 1941

2,242,129

UNITED STATES PATENT OFFICE 2,242,129

METHOD AND APPARATUS FOR MAKING OPTICAL GLASS

John C. Hostetter, West Hartford, Conn., assignor to Corning Glass Works, Corning, N. Y., a corporation of New York Application February 7, 1939, Serial No. 255,130

9 Claims. (Cl. 49—54)

This invention relates to improvements in means and methods for manufacturing optical glass.

Glass which is to be used for optical purposes such as in the formation of lenses, prisms and the like in which light rays passing through the glass must be accurately refracted throughout the entire members, must be the highest degree of uniformity to give satisfactory optical results. Most optical glass is melted in refractory pots or similar containers. Due to the high viscosity of glass and glass making ingredients in a molten state, it is extremely difficult to obtain a uniform composition throughout the molten mass and these non-uniformities appear as stones, cords and striae in the solidified glass. An improved uniformity may be obtained by stirring the glass in a molten condition, but this is only temporarily effective as convection currents caused by differences in the temperature at spaced points in the mass will tend to effect a washing of the molten glass over the refractory walls of the container, with a resultant tendency to attack the walls and introduce additional cord forming impurities. All of the so-called refractory oxides and most metals are soluble in glass to a greater or lesser degree, and this is particularly true of the clays from which glass house refractories are commonly made. Localized concentrations of the dissolved refractory material in glass result in areas having different physical characteristics which are the cords and striae referred to above. This washing action is particularly pronounced during the period when the glass is being cooled for solidification with the result that cords and striae are introduced at a time when it is impossible to subsequently remove them by stirring, fining and like operations earlier available. For this reason, it has been common practice to break up a solidified mass of optical glass discarding those parts which contain imperfections and retaining only those chunks which are suitable for use. In this practice the selected glass seldom amounts to 25% of the total volume melted.

The present invention has for its object a method of making optical glass which will reduce the cords and striae thruout the mass of the glass melt and give a high yield of useful glass. A further object of the invention is a device particularly adapted for the melting and cooling of optical glass according to the method of the present invention.

In the present invention it has been found that cords and striae may be reduced to a minimum thruout the major portion of a melt and the useable proportion of a melt of optical glass materially increased by progressively and rapidly cooling the glass in the melting container from the bottom upwardly toward the exposed upper surface in substantially uniform increments of thickness. Preferably the glass is melted and fined in the container in the usual manner, stirring being employed in the fining operation to mechanically aid in homogenizing the glass and eliminating zones of differing compositions. Immediately upon completion of the homogenizing and fining operations, cooling of the melt is commenced, preferably over the entire bottom area of the container. The rate of cooling is preferably as great as may be reasonably obtained through the refractory wall of the container including the application of cooling air or fluid to said container. The purpose of this initial cooling is to solidify as rapidly as possible the contaminated layer of glass in contact with the refractory thereby preventing the mixing of this glass into the main mass of the melt.

As an aid in achieving and maintaining uniform conditions in the glass, it is desirable to limit the temperature differences in various portions of the melt to the lowest possible values and thus reduce thermal convection currents to a minimum. To this end it is desirable to surround the entire melting container with insulating material. When it is desired to commence cooling the melt, the insulation may be first removed from the bottom of the container and, if desired, a cooling medium applied thereto. To avoid convection currents during the cooling operation which would tend to introduce contaminating glass from adjacent the side walls into the body of the glass, it is desired to cool the mass substantially uniformly thruout the entire area of each increment of thickness from the bottom of the container to the surface thereof, the lowest increments or layers solidifying first and, due to the temperature differentials maintained in the mass, causing progressive solidification of the mass from the bottom upwardly. This may best be accomplished by maintaining a limited application of heat uniformly over the upper surface of the body of glass to maintain its temperature uniform and at the highest temperature of any point in the body as it cools from the bottom upwardly.

After the lowest layer has solidified on the bottom of the container, the insulation surrounding its lateral walls may be gradually removed commencing at the bottom of the container and working upwardly thus permitting first one layer and then another of the glass to lose heat through the container walls and solidify. Forced cooling of the walls may be used if desired, but their small area compared to the volume of the body of glass inevitably results in the major portion of the contained heat being dissipated through the bottom of the container. For the small amount of heat required to be lost through the walls, normal radiation to atmosphere is generally sufficient. Since this process of cooling prevents the existence of extreme differences in temperature between the sides and center of the glass of a given layer during its cooling, there is very little tendency for the glass adjacent the walls of the container to move inwardly during cooling and only a thin body of glass actually in contact with the refractory acts thereon and is contaminated thereby.

One form of apparatus by which the process of the present invention may conveniently be practiced is shown in the accompanying drawings in which.

Figure 1:
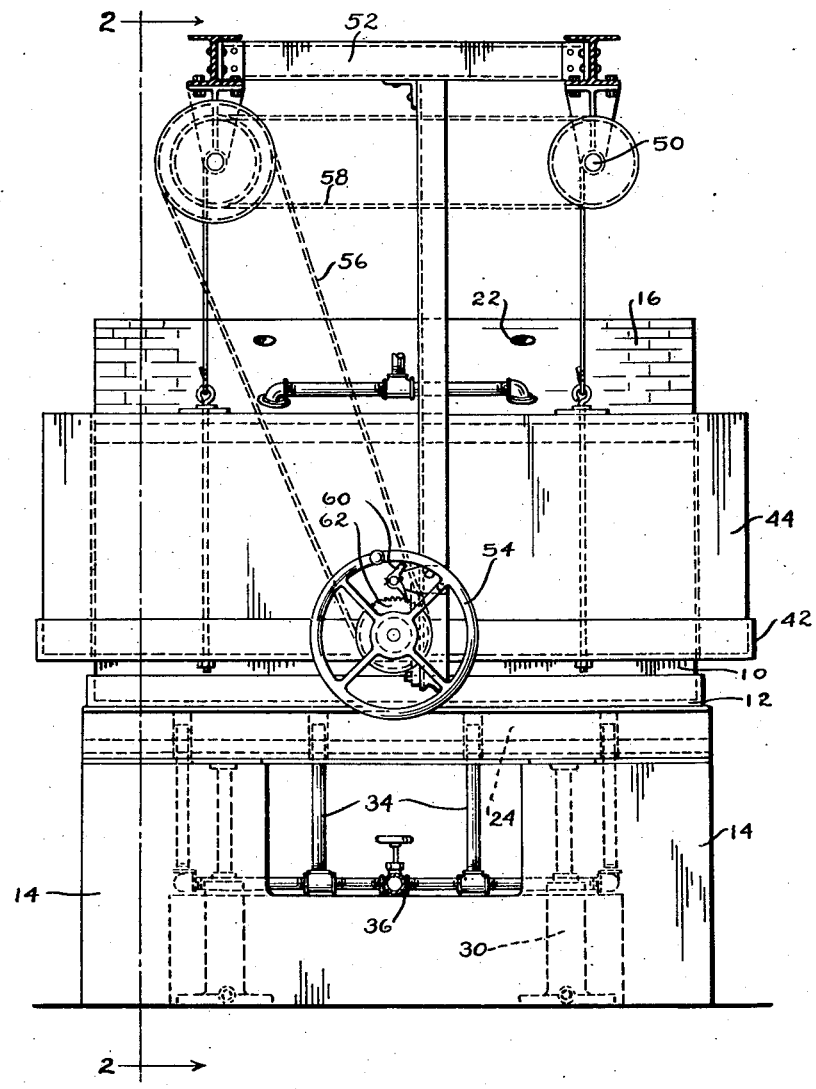
Fig. 1 is a side elevation.

In the disclosed structure, 10 indicates a glass tank of relatively small capacity whose walls and floor are preferably formed of blocks of cast refractory material of relatively high thermal conductivity. This tank or container may be supported on a metal floor 12 which is supported in raised position by piers 14. Tank 10 is covered by an arch 16 and curtain walls 18 and its contents are heated by suitable means such as burners 20 introduced through the arch 16. Openings 22 are also provided in the arch both as vents and for the introduction of stirring implements, not shown.

To reduce the heat loss from the tank during melting of the charge of glass and to provide means for regulating the loss of heat from the tank during cooling, removable insulation is provided which is substantially coextensive with the floor and side walls of the tank. While any form of support may be used which enables the insulation to be readily removed, and in the proper sequence, it has been found desirable to support the insulation 24 beneath the tank on a plate 26 which is supported on the pistons 28 of a number of fluid motors 30. These motors may be connected with a regulable source of fluid pressure, not shown, by pipes 32. When pressure is applied to motors 30, the plate 26 is lifted by pistons 28 and the insulation 24 brought into contact with floor 12. In order to accelerate the cooling of the glass in the bottom of the tank when the insulation 24 is lowered, a number of nozzles 34 are provided at spaced points beneath the tank which are connected with a suitable source of cooling fluid under pressure by means of valved conduit 36. In order that these nozzles may be permanently positioned in operating position despite the presence of the insulation 24, the nozzles 34 are preferably vertically disposed and register with openings 38 formed through the insulation 24 and its supporting plate 26. A support for the nozzle assembly is shown at 40.

Since it is necessary for the performance of the process of the present invention that the insulation be removed from the sides of the tank in progressive increments commencing at the bottom and working upwardly, a special installation of insulation has been devised and as shown includes a support 42 extending around the tank and carrying a body of insulation 44 coextensive in length therewith and of a height substantially the same as the tank walls. Rods 46 extend through the insulation 44 and are secured to the support 42. Cables 48 are attached to the upper ends of rods 46 and are secured to shafts 50 mounted in frame 52 and extending horizontally above the tank. Means are provided for rotating shafts 50 in synchronism in the form of a hand wheel 54, drive chain 56, and interconnecting drive chain 58. A pawl 60 mounted on frame 52 engages ratchet wheel 62 attached to the shaft of hand wheel 54 and locks the insulation 44 against vertical movement at any desired elevation.

Figure 2:
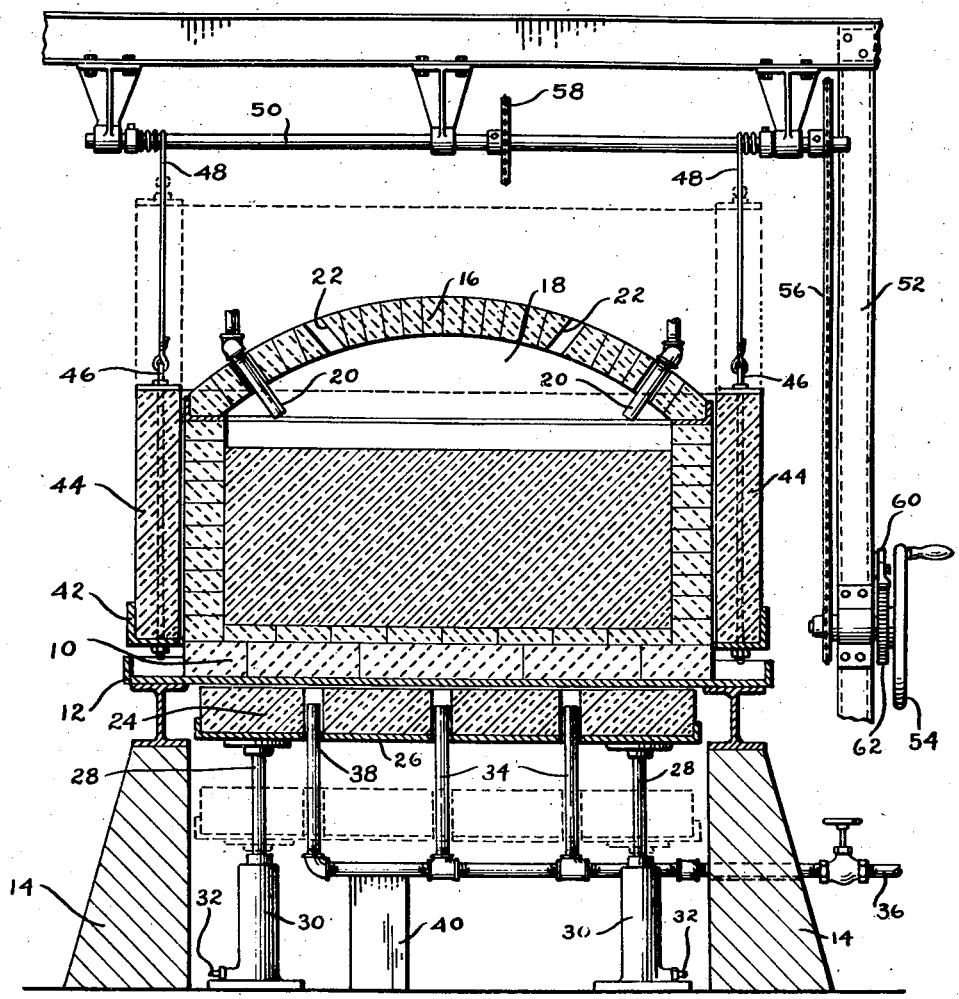
Fig. 2 is a sectional elevation on line 2—2 of Fig. 1.

In the operation of the disclosed structure, according to the method of the present invention, a charge of glass making materials is placed within the tank 16 and melted by heat supplied by burners 20. Fining of the glass may be accomplished in the customary manner assisted by mechanical agitation with implements introduced through openings in the arch 22. During these operations, the insulation 24 is preferably in its raised position in contact with the plate 12 while insulation 44 is lowered so that it encloses the side walls of the tank 10. As shown in Figs. 1 and 2, the insulation 44 is raised slightly above its normal melting and fining position for clarity of disclosure. When a satisfactory degree of homogeneity has been achieved in the charge of glass, the insulation 24 is lowered by means of motors 30 to the position shown in dotted lines in Fig. 2. Cooling fluid such as air or even a fine spray of water may then be applied to the bottom of the tank by means of nozzles 34. In this manner the glass in contact with the bottom of the tank is rapidly solidified and, since the entire area is uniformly chilled, little or no convection movement of the charge will take place. After a suitable time, which can be determined by calculation or experimentation, insulation 44 is raised slightly exposing an initial increment of wall surface to atmosphere for radiation cooling. Cooling by means of the jets from nozzles 34 is, of course, continued and as each layer of glass is solidified the insulation 44 is raised exposing a further increment of wall surface. This movement may be either continuous or intermittent as dictated by operating expediency. During the cooling operation, heat may be applied to the upper surface of the charge as necessary to maintain this surface hotter than any other point in the charge. This heat will be gradually decreased during the cooling of the glass.

While a preferred form of apparatus has been disclosed for the practice of the method of the invention, it is obvious that other structures may be employed if desired. For example, permanent supports for various bodies of insulation may be built into or around the glass container structure and the bodies of insulation may be manually placed thereon or removed therefrom as desired during the melting and cooling operations. The only definite requirement for such a structure is that it must permit removal of the lowest tiers of insulation from around the walls of the tank while maintaining insulation in position about the upper portions of the walls. Modification of the method and apparatus generally is contemplated within the scope of the appended claims.

What is claimed is:

1. The method of forming highly homogeneous glass which comprises melting and fining a refractory charge of glass in a container which tends to dissolve in said glass, stirring said glass during said fining operation to uniformly disperse dissolved refractory thruout the body of said charge and render said fined glass thoroughly homogeneous throughout the major portion of its mass, and cooling said charge immediately after completion of said fining operation to solidify the charge, said cooling being so controlled that the glass solidifies uniformly in horizontal strata from the bottom upwardly.

2. The method of forming optical glass which comprises melting and fining a body of glass in a refractory container which dissolves slightly in the glass in contact therewith during said melting and fining operations, cooling the bottom surface of said body to solidify the same while maintaining the upper surface of said body at a temperature near its softening point and regulating the temperature of said surfaces to progressively solidify said body from the bottom upwardly with a minimum of convection currents along the walls of the refractory container.

3. The method of forming optical glass which comprises melting and fining a body of glass in a refractory container which dissolves slightly in the glass in contact therewith during said melting and fining operations, cooling the bottom of said body to solidify the same while maintaining the surface of said body at a temperature near its softening point and thereafter simultaneously and progressively cooling the sides of said body from the bottom upwardly.

4. The method of forming optical glass which comprises melting, fining and homogenizing a charge of glass in a refractory container which dissolves slightly in the glass in contact therewith during said melting and fining operations and solidifying said charge by the controlled application of a cooling medium to the exterior thereof, horizontal increments of thickness of said charge being maintained substantially uniform in temperature throughout their area during said solidification, adjacent layers being progressively cooler from the top to the bottom of said charge.

5. Apparatus for forming optical glass comprising a refractory container, means for supporting said container, means for melting a charge of glass therein, insulation substantially enclosing the side walls and bottom of said container, and means for supporting said insulation adjacent the sides and the bottom of said container independently of each other and of said container.

6. Apparatus for forming optical glass comprising a refractory container, means for melting a charge of glass therein, insulation substantially enclosing the side walls and bottom of said container, means for removing said insulation from the bottom of said container while maintaining it in position about the side walls thereof and means for regulably cooling the bottom of said container.

7. Apparatus for forming optical glass comprising a refractory container, means for melting a charge of glass therein, insulation substantially enclosing the side walls and bottom of said container, means for removing said insulation from the bottom of said container while maintaining it in position about the side walls thereof and means for progressively removing said insulation from adjacent the side walls of said container commencing with the lowest portions thereof.

8. Apparatus for forming optical glass comprising a refractory container, means for melting a charge of glass therein, insulation substantially enclosing the side walls and bottom of said container and means for simultaneously removing the insulation from the bottom of said container throughout its area.

9. Apparatus for forming optical glass comprising a refractory container, means for melting a charge of glass therein, insulation substantially enclosing the side walls and bottom of said container, and means for removing the insulation from proximity with the side walls of said container commencing at the bottom thereof and working upwardly.

JOHN C. HOSTETTER.